United States Patent
Kawano et al.

(10) Patent No.: US 10,397,625 B2
(45) Date of Patent: Aug. 27, 2019

(54) MOVING-IMAGE PARAMETER SELECTION DEVICE, MOVING-IMAGE PARAMETER SELECTION METHOD, AND PROGRAM

(71) Applicant: NIPPON TELEGRAPH AND TELEPHONE CORPORATION, Chiyoda-ku (JP)

(72) Inventors: Taichi Kawano, Musashino (JP); Hiroshi Yamamoto, Musashino (JP); Kei Takeshita, Musashino (JP); Kazumichi Sato, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 15/578,392

(22) PCT Filed: Apr. 8, 2016

(86) PCT No.: PCT/JP2016/061570
§ 371 (c)(1),
(2) Date: Nov. 30, 2017

(87) PCT Pub. No.: WO2016/194478
PCT Pub. Date: Dec. 8, 2016

(65) Prior Publication Data
US 2018/0220178 A1 Aug. 2, 2018

(30) Foreign Application Priority Data
Jun. 4, 2015 (JP) ................................. 2015-113686

(51) Int. Cl.
*H04N 21/258* (2011.01)
*H04N 21/442* (2011.01)
(Continued)

(52) U.S. Cl.
CPC ... *H04N 21/25866* (2013.01); *H04N 21/2543* (2013.01); *H04N 21/266* (2013.01); *H04N 21/2662* (2013.01); *H04N 21/44222* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0180697 A1* | 12/2002 | Freiberger | ............. | G09F 27/00 345/156 |
| 2002/0184626 A1* | 12/2002 | Darbee | ................... | G06F 3/147 725/39 |

(Continued)

OTHER PUBLICATIONS

International Search Report dated Jun. 21, 2016 in PCT/JP2016/061570 filed Apr. 8, 2016.

(Continued)

*Primary Examiner* — Alexander Gee
(74) *Attorney, Agent, or Firm* — Oblon, McClelland, Maier & Neustadt, L.L.P.

(57) ABSTRACT

A moving-image parameter selection device includes a storage unit configured, for each distribution of a video in a past, to associate a combination of values of moving-image parameters used for the distribution, with a KPI related to the distribution, to store the associated combination; and a selector configured, for each of the combinations, to calculate an average of the KPI, to execute a significance test for each of the averages of the KPIs with respect to one of the averages of the KPIs of the combinations, and based on results of the significance tests, to select a part of combinations among the combinations, and thereby, enables selection of moving-image parameters that contribute to increasing the profit of a video distribution service.

6 Claims, 4 Drawing Sheets

(51) Int. Cl.
H04N 21/266 (2011.01)
H04N 21/2543 (2011.01)
H04N 21/2662 (2011.01)

(56) References Cited

U.S. PATENT DOCUMENTS

| | | | |
|---|---|---|---|
| 2008/0306999 A1* | 12/2008 | Finger | G06F 16/4393 |
| 2013/0160062 A1* | 6/2013 | Carney | H04N 21/23439 725/95 |
| 2013/0169863 A1* | 7/2013 | Smith | H04N 7/01 348/441 |
| 2014/0351835 A1* | 11/2014 | Orlowski | H04N 21/44204 725/9 |
| 2015/0289231 A1* | 10/2015 | Basra | H04W 72/1242 370/312 |
| 2017/0039389 A1* | 2/2017 | Smith | G06F 21/6263 |

OTHER PUBLICATIONS

Hiroshi Yamamoto, "[Special Talk] Toward QoE-centric Operation of Telecommunication Services" IEICE Technical Report, Nov. 2014, pp. 31-34 (with English Abstract).

Hiroshi Yamamoto, et al., "Viewing quality optimization technology (Quality API)" NTT Gijutsu Journal, vol. 27, No. 4, Apr. 2015, 13 Pages (with English language translation).

Taichi Kawano, et al., "Performance comparison of subjective quality assessment method for 3D video" IEICE Technical Report, vol. 112, No. 218, Sep. 2012, 10 Pages (with English Abstract).

* cited by examiner

FIG.4

| DISTRIBUTION CONTROL ID | KPI |
|---|---|
| 1 | 100 |
| 1 | 200 |
| 1 | 100 |
| 2 | 300 |
| 2 | 500 |
| 2 | 400 |
| ⋮ | ⋮ |

FIG.5

| DISTRIBUTION CONTROL ID | AVERAGE KPI | SIGNIFICANT DIFFERENCE |
|---|---|---|
| 1 | 133.3 | TRUE |
| 2 | 400.0 | FALSE |
| ⋮ | ⋮ | ⋮ |

MOVING-IMAGE PARAMETER SELECTION DEVICE, MOVING-IMAGE PARAMETER SELECTION METHOD, AND PROGRAM

TECHNICAL FIELD

The present invention relates to a moving-image parameter selection device, a moving-image parameter selection method, and a program.

BACKGROUND ART

In recent years, video distribution service via a network has become widespread. It is important for a service provider to raise user satisfaction in order to increase the profit. The user satisfaction of a video distribution service is determined by various factors including price, content, user interface, audiovisual environment, audiovisual device, moving-image quality (clearness of images, smoothness of motion over images, etc.), playback quality (time after a playback was requested until the playback starts, length and frequency of interruption during a playback, etc.), and the like. Factors depending on a user such as the audiovisual environment and the audiovisual device are factors that cannot be controlled by a service provider. Also, the price, content, and user interface are difficult to change in real time while a video distribution service is viewed and listened to, and it is desirable to optimize these factors by periodical change of the service. On the other hand, the moving-image quality and playback quality depend on moving-image parameters (bit rate, resolution, framerate, and the like) of a video being distributed, and hence, can be optimized in real time by distribution control while a video distribution service is being presented. In order to execute distribution control in real time that raises the user satisfaction, it is important to select optimal moving-image parameters depending on conditions such as network states used for the video distribution service.

Conventionally, a framework is described in Non-patent document 1 that controls moving-image parameters to optimize QoE (Quality of Experience) based on a user QoE estimation model built from result data of experiments in which a user views and evaluates a video (subjective evaluation experiment).

RELATED ART DOCUMENTS

Non-Patent Documents

Non-patent document 1: Koji Yamamoto, "Toward QoE-centric Operation of Telecommunication Services", IEICE Tech. Rep., vol. 114, no. 298, pp. 31-34, November 2014.

SUMMARY OF INVENTION

Problem to be Solved by the Invention

However, since the technology described in Non-patent document 1 is based on result data of a subjective evaluation experiment, optimal control may not necessarily be achieved in an environment having different conditions from those set in the experiment. Also, the QoE estimation model described in Non-patent document 1 is a limited one that only examines QoE caused by the moving-image quality or the playback quality, and does not take other user satisfaction factors such as the price and content into account. Therefore, depending on the conditions, the model may not necessarily contribute to increasing the profit of a video distribution service.

In view of the above, it is an object of the present invention to select moving-image parameters that contribute to increasing the profit of a video distribution service.

Means for Solving the Problem

Thereupon, in order to solve the above problem, a moving-image parameter selection device includes a storage unit configured, for each distribution of a video in a past, to associate a combination of values of moving-image parameters used for the distribution, with a KPI related to the distribution, to store the associated combination; and a selector configured, for each of the combinations, to calculate an average of the KPI, to execute a significance test for each of the averages of the KPIs with respect to one of the averages of the KPIs of the combinations, and based on results of the significance tests, to select a part of combinations among the combinations.

Advantage of the Invention

It is possible to select moving-image parameters that contribute to increasing the profit of a video distribution service.

BRIEF DESCRIPTION OF DRAWINGS

FIG. 4 is a diagram illustrating an example of pairs of distribution control IDs and KPIs; and FIG. 5 is a diagram illustrating an example of analysis result data.

EMBODIMENTS OF THE INVENTION

Figure 1:
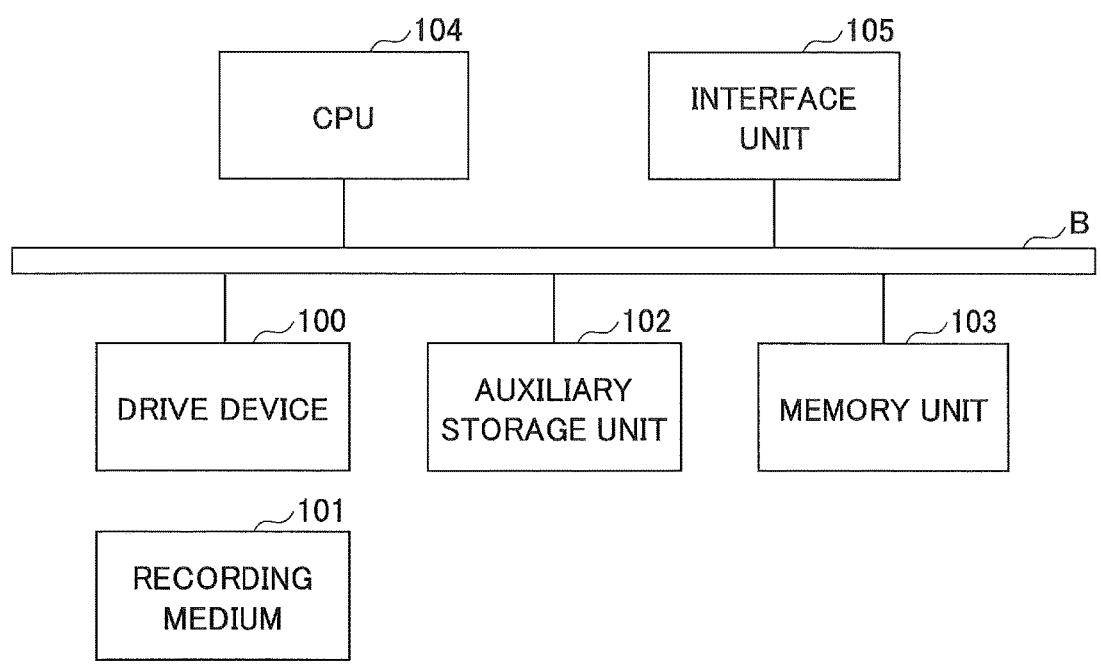
FIG. 1 is a diagram illustrating an example of a hardware configuration of a moving-image parameter selection device in an embodiment of the present invention.

In the following, embodiments will be described with reference to the drawings. FIG. 1 is a diagram illustrating an example of a hardware configuration of a moving-image parameter selection device 10 in an embodiment of the present invention. The moving-image parameter selection device 10 in FIG. 1 includes a drive device 100, an auxiliary storage unit 102, a memory unit 103, a CPU 104, and an interface unit 105, which are mutually connected by a bus B.

A program that implements processing on the moving-image parameter selection device 10 is provided with a recording medium 101 such as a CD-ROM. When the recording medium 101 storing the program is set in the drive unit 100, the program is installed into the auxiliary storage unit 102 from the recording medium 101 via the drive unit 100. However, installation of the program is not necessarily executed from the recording medium 101, and may also be downloaded from another computer via the network. The auxiliary storage unit 102 stores the installed program, and stores required files, data, and the like as well.

Upon receiving a command to activate the program, the memory unit 103 reads the program from the auxiliary storage unit 102, to load the program. The CPU 104 executes a function relating to the moving-image parameter selection device 10 according to the program stored in the memory unit 103. The interface unit 105 is used as an interface for connecting with the network.

Figure 2:
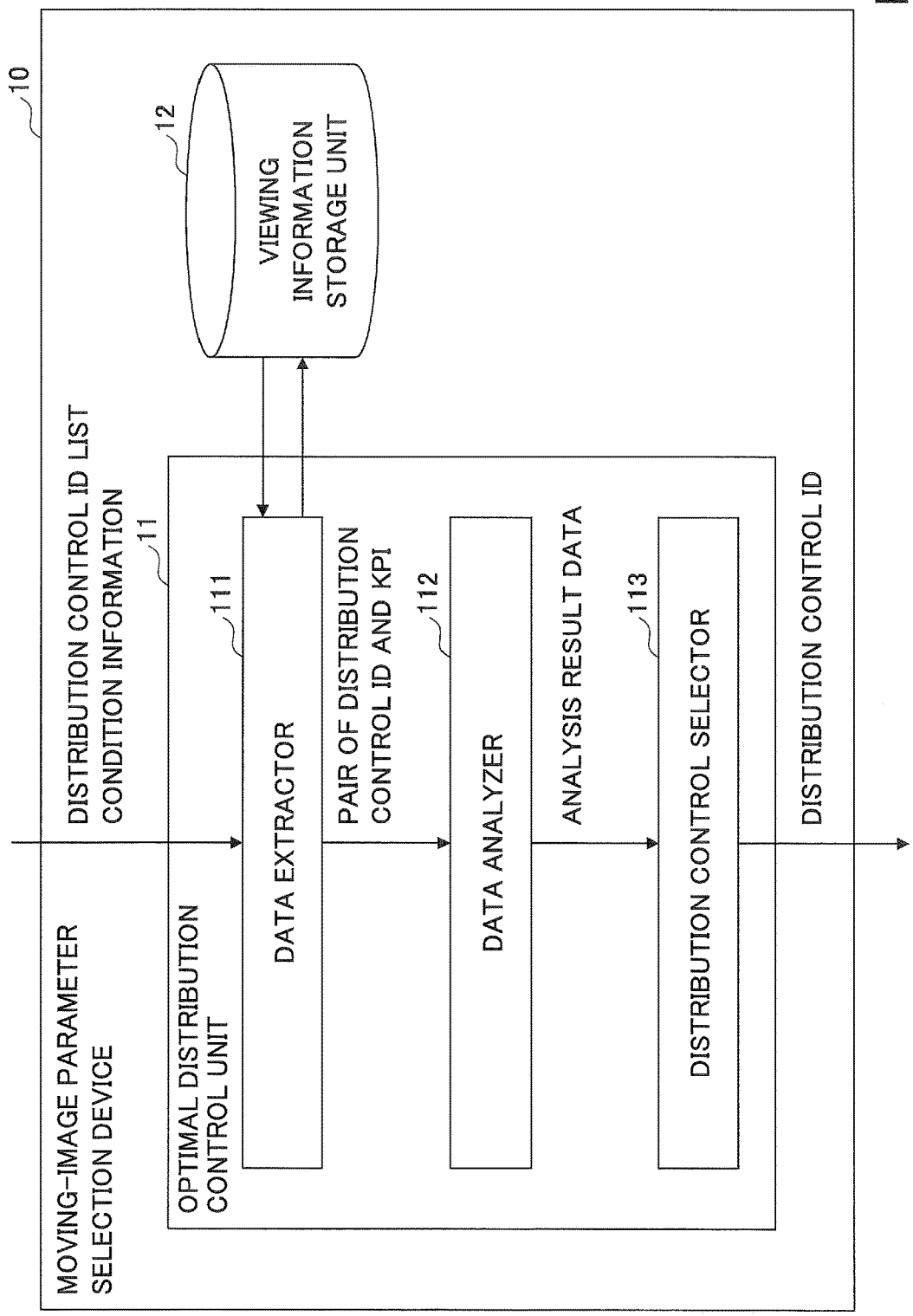
FIG. 2 is a diagram illustrating an example of a functional configuration of a moving-image parameter selection device in an embodiment of the present invention.

FIG. 2 is a diagram illustrating an example of a functional configuration of the moving-image parameter selection device 10 in the embodiment of the present invention. In FIG. 2, the moving-image parameter selection device 10 includes an optimal distribution control unit 11 and an audiovisual information storage unit 12. The optimal distribution control unit 11 is implemented by processes that one or more programs installed in the estimation device 10 cause the CPU 104 to execute. Also, the audiovisual information storage unit 12 can be implemented by using, for example, the auxiliary storage unit 102 or a memory unit that can be connected to the moving-image parameter selection device 10 via the network. Note that the moving-image parameter selection device 10 is used by, for example, a service provider of a video distribution service.

The audiovisual information storage unit 12 stores information of each session of viewing and listening to a video (referred to as "audiovisual information") in the past in the video distribution service. An item of the audiovisual information includes, for example, a distribution control ID and a KPI (Key Performance Indicator) that are associated with the viewing and listening session. Note that since the viewing and listening session of a video, and distribution of the video form a pair, the audiovisual information storage unit 12 may be considered to store, for each distribution of videos in the past, audiovisual information associated with the distribution.

A distribution control ID is a value to identify a combination of values of moving-image parameters when a video that has been viewed and listened to was distributed. The moving-image parameters include, for example, video bit rate, audio bit rate, video encoding scheme ID (a value to identify a video encoding scheme), an audio encoding scheme ID (a value to identify an audio encoding scheme), frame size (1920 pixels×1080 pixels, etc.), and framerate. Types of the moving-image parameters that can be selected by a service provider, and values that can be selected for each video parameter used when distributing a video depend on a service design of the video distribution service provider.

A KPI is a performance evaluation indicator that can be obtained for each viewing and listening session of video, which is important for achieving an increased profit of a video distribution service. In the present embodiment, the KPI is a value of any one of the items among, for example, viewing and listening time, viewing and listening completion rate (a value obtained by dividing the viewing and listening time by the length of a video), website dwell time, application dwell time, and rating of the video. However, multiple items among these items may be combined into a single value as a derived KPI. Which KPI is to be used depends on management policies and decision of a service provider. Note that the website dwell time is a time during which the user stays at the website in the case where distribution of the video is executed via the website. The application dwell time is a time during which an application was activated in the case where distribution of the video is executed via the application. The rating of a video is an evaluation value given by the user in terms of quality of the video and the like.

The audiovisual information may also include optional items such as video content ID, video category ID, date and time when the viewing and listening session starts, user ID, user type ID, and transmission line type. The optional items depend on policies of the service provider. The video content ID is a value to identify the video content that has been viewed and listened to. The video category ID is a value to identify a category to which the video that has been viewed and listened to belongs among categories based on attributes of video contents discretionarily set by a service provider. The user ID is a value to identify a user who has viewed and listened to the video. The user category ID is a value to identify a category to which the user that has viewed and listened to the video belongs among categories based on user attributes discretionarily set by a service provider. The transmission line type is information representing a transmission line type used for viewing and listening to the video among types such as LTE (Long Term Evolution), 3G, and Wi-Fi (registered trademark).

The optimal distribution control unit 11 selects an optimal combination among combinations of values of the moving-image parameters, based on actual values of KPIs relating to viewing and listening sessions of videos in the past. More specifically, the optimal distribution control unit 11 takes, as input, a list of distribution control IDs that can be selected by the service provider when distributing videos (referred to as a "distribution control ID list") and condition information, and outputs a distribution control ID considered to be optimal. Here, the distribution control ID list is designed by the service provider. Also, the condition information means extraction conditions of data from the audiovisual information storage unit 12, which is described in, for example, SELECT statements of SQL, or a corresponding database manipulation language. Note that data extracted from the audiovisual information storage unit 12 refers to data representing audiovisual information for each viewing and listening session of a video.

In FIG. 2, the optimal distribution control unit 11 of the moving-image parameter selection device 10 includes a data extractor 111, a data analyzer 112, and a distribution control selector 113.

The data extractor 111 takes the distribution control ID list and the condition information as input, and extracts audiovisual information that matches the distribution control ID list and the condition information from the audiovisual information storage unit 12. The data extractor 111 outputs pairs of distribution control IDs and KPIs of the extracted audiovisual information, to the data analyzer 112.

The data analyzer 112 takes the pairs of distribution control IDs and KPIs from the data extractor 111 as input, and outputs analysis result data to the distribution control selector 113. Note that the analysis result data is data including an average of KPIs for each distribution control ID, and a significant difference. This significant difference is a significant difference observed for the average of KPIs for each distribution control ID with respect to the average of KPIs of a default distribution control ID. The default distribution control ID here is one of the distribution control IDs in the distribution control ID list, and the average of KPIs of the default distribution control ID is an average of KPIs of the audiovisual information including an distribution control ID that is equivalent to the default distribution control ID, among the audiovisual information stored in the audiovisual information storage unit 12.

For example, a distribution control ID corresponding to a specific video bit rate or the lowest video bit rate may be selected as the default distribution control ID. Also, a distribution control ID corresponding to a combination of values of the moving-image parameters set as default values when providing a normal video distribution service, may be selected as the default distribution control ID. Which one of the IDs in the distribution control ID list is to be selected as the default distribution control ID, depends on the service provider. Also, the default distribution control ID may be fixed or dynamically generated by an algorithm. Also, the default distribution control ID or the algorithm to generate the default distribution control ID may be stored in the moving-image parameter selection device 10, or may be obtained from the outside by communication. Furthermore, different default distribution control IDs may be retained for respective items of condition information. In other words, different default distribution control IDs may be used for a case where a certain item of condition information is input, and a case where another item of condition information is input.

The distribution control selector 113 takes the analysis result data from the data analyzer 112 as input, and selects and outputs a distribution control ID corresponding to a combination of values of the moving-image parameters that enables optimal distribution control.

Figure 3:
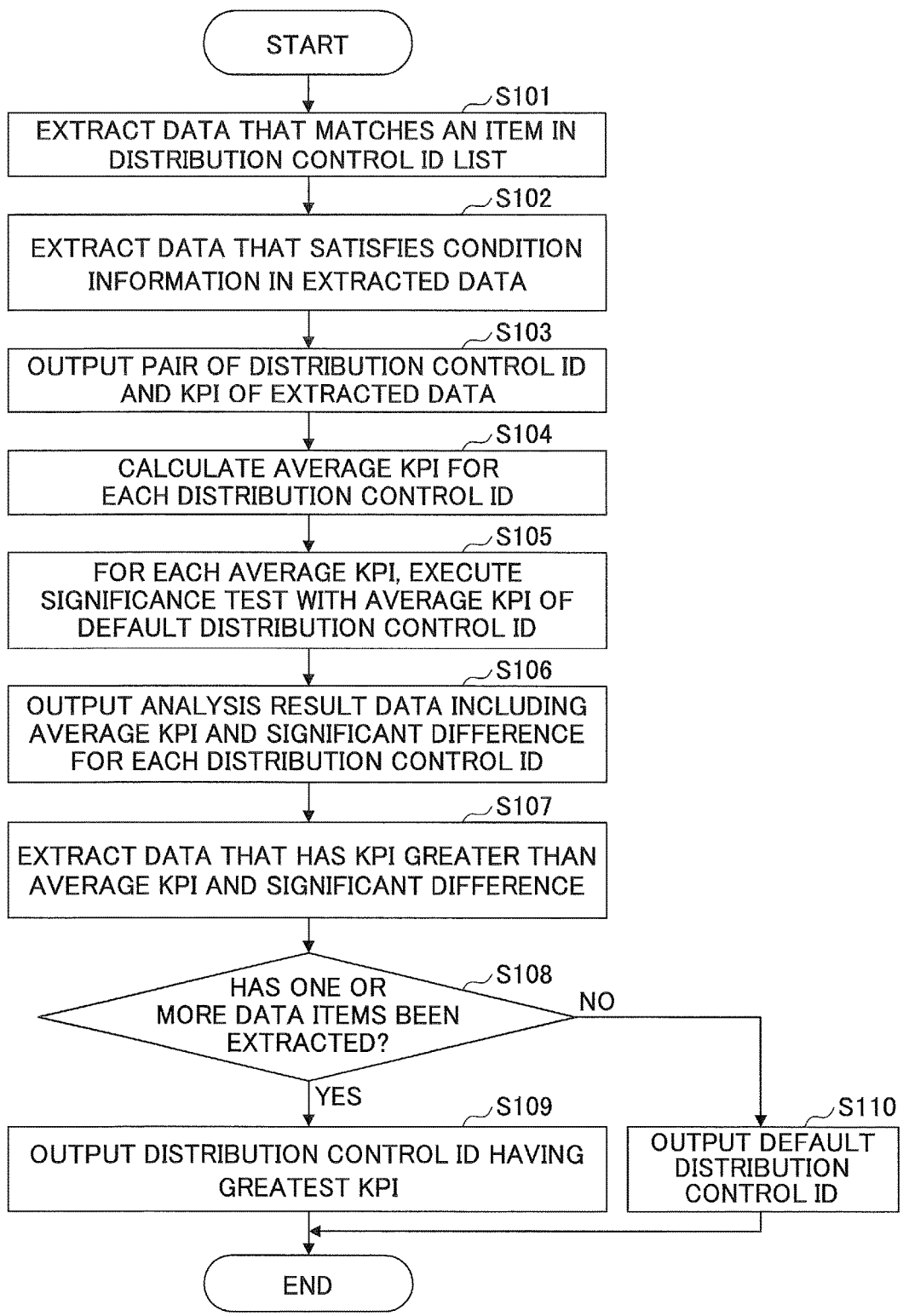
FIG. 3 is a flowchart illustrating an example of processing steps executed by a moving-image parameter selection device.

Next, processing steps executed by the moving-image parameter selection device 10 will be described. FIG. 3 is a flowchart illustrating an example of processing steps executed by the moving-image parameter selection device 10. Note that the process in FIG. 3 may be executed, for example, periodically. In this case, the cycle depends on timing at which the service provider may wish to change distribution control IDs.

At Step S101, the data extractor 111 extracts data including one of the distribution control IDs included in the distribution control ID list taken as input, from the audiovisual information storage unit 12.

For example, if the audiovisual information storage unit 12 is an RDB (Relational Database), corresponding data may be extracted based on the following SQL (Structured Query Language) statement: SELECT_DELIVERY_CONTROL_ID, KPI, CONDITION_INFO FROM VIEW_INFO_TABLE WHERE DELIVERY_CONTROL_ID IN INPUT_DELIVERY_CONTROL_ID_LIST Here, VIEW_INFO_TABLE represents a table in which the audiovisual information is stored, with respect to the audiovisual information storage unit 12; DELIVERY_CONTROL_ID represents a column in which distribution control IDs are stored in the table; KPI represents a column in which KPIs are stored in the table; INPUT_DELIVERY_CONTROL_ID_LIST represents the distribution control ID list; and CONDITION_INFO represents a column in which condition information items are stored in the table. Therefore, the distribution control ID, the KPI, and the condition information of each data item including one of the distribution control IDs included in the distribution control ID list taken as input are obtained among the data stored in the audiovisual information storage unit 12. Note that the corresponding data may be extracted by an SQL statement other than the above.

Note that the distribution control ID list taken as input may be a list of distribution control IDs that constitute a part of the distribution control IDs that can be selected by the service provider.

Next, the data extractor 111 extracts data that satisfies the condition information taken as input, among the data extracted at Step S101 (Step S102). Such extraction of data may be executed, for example, based on the following SQL statement: SELECT_DELIVERY_CONTROL_ID, KPI FROM OUTPUT_TABLE WHERE CONDITIONAL_EXPRESSION Here, OUTPUT_TABLE represents the data extracted at Step S101, and CONDITIONAL_EXPRESSION represents a conditional expression using the condition information.

Note that the condition information is, for example, information representing conditions related to optional information included in the audiovisual information. For example, using the condition information narrows down objects to be processed, to data relating to viewing and listening sessions during a specific time range, and data relating to viewing and listening sessions of a specific video.

Next, the data extractor 111 outputs pairs of distribution control IDs and KPIs of respective data items extracted at Step S102 (Step S103).

FIG. 4 is a diagram illustrating an example of pairs of distribution control IDs and KPIs. As illustrated in FIG. 4, a list of pairs of distribution control IDs and KPIs of respective data items extracted at Step S102 is output by the data extractor 111.

Note that Steps S101 and S102 may be executed at the same time, or may be executed in reverse order. Also, a distribution control ID list and condition information do not need to be input. In other words, pairs of distribution control IDs and KPIs may be obtained with respect to the entire data stored in the audiovisual information storage unit 12.

Next, the data analyzer 112 calculates an average for each distribution control ID (referred to as an "average KPI") from the list of pairs of distribution control IDs and KPIs output from the data extractor 111 (Step S104). In other words, pairs of distribution control IDs and KPIs illustrated in FIG. 4 are classified into groups where each group has a common distribution control ID, and the average KPI is calculated for each group. Calculation of the average KPI may be executed, for example, based on the following SQL statement: SELECT_DELIVERY_CONTROL_ID, Ave (KPI) FROM DELIVERY_CONTROL_ID_DATA GROUP BY DELIVERY_CONTROL_ID Here, DELIVERY_CONTROL_ID represents a column in which distribution control IDs are stored in FIG. 4; KPI represents a column in which KPIs are stored in FIG. 4; and DELIVERY_CONTROL_ID_DATA represents a table illustrated in FIG. 4.

Note that instead of the simple average of KPIs stored in the audiovisual information storage unit 12 for respective audiovisual information items, calculation may be executed for each distribution control ID with respect to a ratio of viewing and listening time having reached a certain value or greater; a user average of the count of viewing and listening sessions; a user average of the count of registered favorite items; a user average of the count of transition to paying membership; a user average of the count of withdrawal from paying membership; and a user average of the count of withdrawal from free membership, so as to set one of these calculation results as the average KPI. Here, a "ratio of viewing and listening time having reached a certain value or greater" is the ratio of viewing and listening sessions in which the viewing and listening time has reached a certain value (for example, 80%) or greater. Also, "a user average of the count of [variable]" is the count per user. In other words, it is a value obtained by dividing the count by the number of users. Note that the number of users used as the denominator when calculating the user average of the count of transition to paying membership, and the user average of the count of withdrawal from paying membership, may be the number of paying members, or may include the number of free members. Similarly, when calculating the user average of the count of withdrawal from free membership, the number of users used as the denominator may be the number of free members, or may include the number of paying members. Also, the count of registered favorite items, the count of transition to paying membership, the count of withdrawal from paying membership, and the count of withdrawal from free membership may be calculated based on information that has been recorded when respective events of registering a favorite item, transition to paying membership, withdrawal from paying membership, and withdrawal from free membership occurred.

Next, the data analyzer 112 executes a significance test with respect to the average KPI of the default distribution control ID for the average KPI for each distribution control ID calculated at Step S104 (Step S105). Although a Student's t-test is used as the significance test in the present embodiment, another method of significance test may be used. Also, various parameters (significance level=5%, etc.) of a significance test are set discretionarily by a service provider. Note that the default distribution control ID is stored, for example, in the auxiliary storage unit 102 in advance. Also, the average KPI of the default distribution control ID may be stored in the auxiliary storage unit 102 in advance, or may be calculated at a timing of Step S105.

Next, the data analyzer 112 outputs a result of the significance test between the average KPI for each distribution control ID, and the average KPI of the default distribution control ID, as analysis result data (Step S106).

FIG. 5 is a diagram illustrating an example of analysis result data. As illustrated in FIG. 5, the analysis result data includes the average KPI and the significant difference for each distribution control ID. The average KPI is the average of KPIs of the distribution control ID. The significant difference is information representing existence of a significant difference, and the value is "TRUE" or "FALSE". "TRUE" represents that there is a significant difference, and "FALSE" represents that there is no significant difference.

Next, the distribution control selector 113 extracts data of a distribution control ID that has an average KPI greater than the average KPI of the default distribution control ID, and has a significant difference (the significant difference="TRUE"), among the analysis result data output from the data analyzer 112 (Step S107).

Next, the distribution control selector 113 determines whether one or more data items have been extracted (Step S108). If one or more data items have been extracted (YES at Step S108), the distribution control selector 113 outputs the distribution control ID of a data item having the maximum average KPI among the extracted data items, as identification information of a combination of values of the moving-image parameters that enables optimal distribution control (Step S109). However, distribution control IDs of several data items having top average KPIs may be output.

On the other hand, if a corresponding data item has not been extracted (NO at Step S108), the distribution control selector 113 outputs the default distribution control ID as identification information of a combination of values of the moving-image parameters that enables optimal distribution control (Step S110).

The service provider uses, for example, the combination of the values of moving-image parameters relating to the distribution control ID having been output, to distribute the video.

Note that in order to reduce the processing cost, the memory unit 103 or the auxiliary storage unit 102 may store a database (a cache database) of the distribution control ID list, the condition information, and distribution control IDs extracted based on the distribution control ID list and the condition information. In this case, a distribution control ID may be derived by referring to the cache database, which corresponds to the distribution control ID list and the condition information that have been input. The cache database may be constructed by accumulating past execution results of the process in FIG. 3. Alternatively, the process in FIG. 3 may be executed with respect to distribution control ID lists and condition information set discretionarily, to construct the cache database, or both may be combined.

As described above, according to the present embodiment, when distributing a video, a distribution control ID list that can be selected by a service provider is given as input, and an average KPI is calculated from KPIs for each distribution control ID included in audiovisual information items. A significance test (t-test or the like) is executed between each of the average KPIs and the average KPI of the default distribution control ID, and a distribution control ID having a significant difference when compared with the average KPI of the default distribution control ID, and having a higher average KPI, is selected as an optimal combination of moving-image parameters used for the distribution. Therefore, based on the past actual results, one can expect realization of distribution control by which QoE becomes higher along with the KPI. In other words, values of moving-image parameters can be selected that have versatility not constrained to conditions set for an experiment, and that directly contribute to increasing the profit of a video distribution service.

Note that in the present embodiment, the moving-image parameter selection device 10 is an example of a moving-image parameter selection device. The distribution control selector 113 is an example of a selector.

As above, the embodiments of the present invention have been described in detail. Note that the present invention is not limited to such specific embodiments, but various variations and modifications may be made within the scope of the subject matters of the present invention described in the claims.

The present patent application claims priority based on Japanese Patent Application No. 2015-113686, filed on Jun. 4, 2015, and the entire contents of the Japanese Patent Application are incorporated herein by reference.

LIST OF REFERENCE SYMBOLS 10 moving-image parameter selection device
11 optimal distribution control unit
12 audiovisual information storage unit
100 drive device
101 recording medium
102 auxiliary storage unit
103 memory unit
104 CPU
105 interface unit
111 data extractor
112 data analyzer
113 distribution control selector
B bus

The invention claimed is:

1. A moving-image parameter selection device, comprising:
a memory configured, for each distribution of a video in a past, to associate a combination of values of moving-image parameters used for the distribution, with a Key Performance Indicator (KPI) related to the distribution, to store the associated combination; and
processing circuitry configured, for each of the combinations, to calculate an average of the KPI, to execute a significance test for each of the averages of the KPIs with respect to one of the averages of the KPIs of the combinations, and based on results of the significance tests, to select a part of combinations among the combinations, and output the selected part of combinations to a service provider which controls distribution of the video in real time based on the selected part of combinations, wherein the moving image parameters for the selected part of combinations includes at least one of a video bit rate, audio bit rate, video encoding scheme identification, an audio encoding scheme identification, frame size, and framerate, and types of the moving-image parameters and values for the moving-image parameters used when distributing the video depend on a service design of the service provider, and are selected by the service provider, and the average of the KPI is based on at least one of values among an average of viewing and listening time, an average of viewing and listening completion rate, an average of website dwell time, an average of application dwell time, and an average of rating of the video, and types of the averages to be based on depend on the service design of the service provider, and are selected by the service provider.

2. The moving-image parameter selection device as claimed in claim 1, wherein the average of the KPI is further based on at least one of a user average of a count of viewing and listening sessions, a user average of a count of registered favorite items, a user average of a count of transition to paying membership, a user average of a count of withdrawal from paying membership, and a user average of a count of withdrawal from free membership.

3. A moving-image parameter selection method executed by a computer, the method comprising:

a selecting step that includes referring to a memory configured, for each distribution of a video in a past, to associate a combination of values of moving-image parameters used for the distribution, with a Key Performance Indicator (KPI) related to the distribution, to store the associated combination;

calculating, for each of the combinations, an average of the KPI, to execute a significance test for each of the averages of the KPIs with respect to one of the averages of the KPIs of the combinations, and based on results of the significance tests, to select a part of combinations among the combinations; and outputting the selected part of combinations to a service provider which controls distribution of the video in real time based on the selected part of combinations, wherein the moving image parameters for the selected part of combinations includes at least two of a video bit rate, audio bit rate, video encoding scheme identification, an audio encoding scheme identification, frame size, and framerate, and types of the moving-image parameters and values for the moving-image parameters used when distributing the video depend on a service design of the service provider, and are selected by the service provider, and the average of the KPI is based on at least one of values among an average of viewing and listening time, an average of viewing and listening completion rate, an average of website dwell time, an average of application dwell time, and an average of rating of the video, and types of the averages to be based on depend on the service design of the service provider, and are selected by the service provider.

4. The moving-image parameter selection method as claimed in claim 3, wherein the average of the KPI is further based on at least one of a user average of a count of viewing and listening sessions, a user average of a count of registered favorite items, a user average of a count of transition to paying membership, a user average of a count of withdrawal from paying membership, and a user average of a count of withdrawal from free membership.

5. A non-transitory computer-readable recording medium having a program stored therein for causing a computer to execute a method, the method comprising:

a selecting step that includes referring to a memory configured, for each distribution of a video in a past, to associate a combination of values of moving-image parameters used for the distribution, with a Key Performance Indicator (KPI) related to the distribution, to store the associated combination; and calculating, for each of the combinations, an average of the KPI, to execute a significance test for each of the averages of the KPIs with respect to one of the averages of the KPIs of the combinations, and based on results of the significance tests, to select a part of combinations among the combinations; and outputting the selected part of combinations to a service provider which controls distribution of the video in real time based on the selected part of combinations, wherein the moving image parameters for the selected part of combinations includes at least two of a video bit rate, audio bit rate, video encoding scheme identification, an audio encoding scheme identification, frame size, and framerate, and types of the moving-image parameters and values for the moving-image parameters used when distributing the video depend on a service design of the service provider, and are selected by the service provider, and the average of the KPI is based on at least one of values among an average of viewing and listening time, an average of viewing and listening completion rate, an average of website dwell time, an average of application dwell time, and an average of rating of the video, and types of the averages to be based on depend on the service design of the service provider, and are selected by the service provider.

6. The medium as claimed in claim 5, wherein the average of the KPI is further based on at least one of a user average of a count of viewing and listening sessions, a user average of a count of registered favorite items, a user average of a count of transition to paying membership, a user average of a count of withdrawal from paying membership, and a user average of a count of withdrawal from free membership.

* * * * *